United States Patent [19]

Gaglianello et al.

[11] Patent Number: 5,526,024
[45] Date of Patent: Jun. 11, 1996

[54] APPARATUS FOR SYNCHRONIZATION AND DISPLAY OF PLURALITY OF DIGITAL VIDEO DATA STREAMS

[75] Inventors: Robert D. Gaglianello, Little Silver; Howard P. Katseff, Manalapan, both of N.J.

[73] Assignee: AT&T Corp., Murray Hill, N.J.

[21] Appl. No.: 289,987

[22] Filed: Aug. 12, 1994

Related U.S. Application Data

[63] Continuation of Ser. No. 849,901, Mar. 12, 1992, abandoned.

[51] Int. Cl.⁶ ........................................ G09G 5/00
[52] U.S. Cl. ................................. 345/185; 345/2
[58] Field of Search .......................... 345/1, 2, 3, 115, 345/118, 112, 185, 196, 197, 201, 198, 200; 348/564, 588; 395/153, 154

[56] References Cited

U.S. PATENT DOCUMENTS

| | | | |
|---|---|---|---|
| 3,255,305 | 7/1966 | Chatten | 358/22 |
| 4,134,131 | 1/1979 | Hopkins | 358/149 |
| 4,283,736 | 8/1981 | Morio | 358/140 |
| 4,471,449 | 9/1984 | Leavitt | 364/512 |
| 4,951,143 | 8/1990 | Waehner | 358/160 |
| 5,218,274 | 6/1993 | Zenda | 345/1 |
| 5,229,852 | 7/1993 | Maietta | 358/140 |

FOREIGN PATENT DOCUMENTS

| | | |
|---|---|---|
| 0108887 | 5/1991 | Japan . |
| 3-108887 | 9/1991 | Japan . |

OTHER PUBLICATIONS

H. P. Katseff et al., "On The Synchronization And Display of Multiple Full–Motion Video Streams," IEEE Proc. Tele. Comm. For Distributed Applications And Systems, Chapel Hill, NC, Apr. 1991, pp. 1–5.

H. P. Katseff et al, "The Liaison Network Multimedia Workstation", Global Comm. Conf., Phoenix, AZ, Dec. 1991, pp. 1–8.

H–D Lin et al, "Video Composition Methods And Their Semantics," IEEE Int'l. Conf., on Acoustics, Speech, and Signal Processing, San Francisco, CA, Mar. 23–26, 1992, pp. 1–17.

W–L Chen et al., "Structured Video: Concept and Display Architecture," Technical Memorandum, Dept of Elec. Eng. & Computer Sciences, Univ. of CA at Berkeley, 1991, pp. 1–17.

Baldwin, J. "DICE: The First Interrontinental digital Standards Converter" Royal Television Society J. 15(5):140–142, 145–146, 149–150, 153–156, 159 Oct. 1974.

*Primary Examiner*—Richard Hjerpe
*Assistant Examiner*—Xiao M. Wu

[57] ABSTRACT

Video image quality is preserved in an asynchronous network by providing a synchronizing arrangement in which the input of video data from an asynchronous network to a video data buffer is synchronized with the reading of information from the video data buffer. Synchronizing video data transfers to and from a video data buffer ensures that video data from only a single frame from a source is displayed on a display monitor at one time, thus maintaining image quality. Furthermore, multiple video data streams from several asynchronous sources can be displayed simultaneously on a single display screen using the synchronization technique. The synchronization arrangement synchronizes receipt of the different data streams into the frame buffer with the output of data from the frame buffer to the display screen.

9 Claims, 7 Drawing Sheets

5,526,024

APPARATUS FOR SYNCHRONIZATION AND DISPLAY OF PLURALITY OF DIGITAL VIDEO DATA STREAMS

This application is a continuation of application Ser. No. 07/849,901, filed on Mar. 12, 1992, now abandoned.

FIELD OF THE INVENTION

This invention relates to digital video systems and, more particularly, to systems for receiving video data transmitted across an asynchronous telecommunication network.

BACKGROUND OF THE INVENTION

Workstations and other digital video telecommunications equipment typically are equipped with a video display that acquires and displays bitmap images through the telecommunications network from video sources. The video display has a single frame buffer which receives bitmap images from the video sources and stores an image of a display screen. Video data is written to the frame buffer in real-time as it arrives from the video sources. At the same time, the display screen is continuously refreshed from top to bottom by video data in the frame buffer.

We have discovered that, in asynchronous communication systems, it is possible for the display screen refresh to overlap with the writing of data from the network to the frame buffer. Such an overlap causes the display screen to be written partially with data from one frame and partially with data from the next frame. That is, at a given moment, the display screen would show some information that was in the frame buffer before the refresh began and some new information received currently from the network. Overlapping of data in this manner produces undesirable artifacts on the display screen.

Multiparty video teleconferencing will increase the demand for improved video capabilities, such as the capability to simultaneously display multiple windows containing video data from different video sources. However, multiple video sources present further complications to the problem described above. In particular, video data will arrive at the frame buffer at different rates from two or more independent, asynchronous sources, thus increasing the probability that the display screen refresh will overlap with the writing of data from one or more of the video sources to the frame buffer.

SUMMARY OF THE INVENTION

Video image quality is preserved in an asynchronous network by providing a synchronizing arrangement in which the input of video data from an asynchronous network to a video data buffer (hereinafter referred to as a "frame buffer") is "synchronized" with the reading of information from the frame buffer to prevent simultaneously writing to and reading from the same location in the frame buffer. In this manner, image quality is maintained because video data from only one frame is scanned to the display screen at any given time.

In an illustrative embodiment of the invention, undesirable artifacts are prevented by partitioning the frame buffer of the workstation display into two or more segments. Each segment includes one or more rows of the frame buffer, each row storing a line of video data. Data are written to one segment of the frame buffer while other video data are read concurrently from the other segment of the frame buffer. The frame buffer sends a synchronization signal to each video filter after each segment has been scanned from the frame buffer to the display screen. When a video filter receives a synchronization signal, it sends to the frame buffer new video data that the video filter has for that segment of the display. This technique allows the video filters to send new data into one segment of the frame buffer while a different segment of the frame buffer is scanned to the display, thus "synchronizing" the writing to and reading from the frame buffer. In this way, it is ensured that data displayed on the display screen come from only a single frame at a time.

BRIEF DESCRIPTION OF THE DRAWINGS

The above and other advantages of the invention will be apparent upon consideration of the following detailed description taken in conjunction with the accompanying drawings in which like reference numbers refer to like parts throughout and in which.

DETAILED DESCRIPTION

Figure 1:
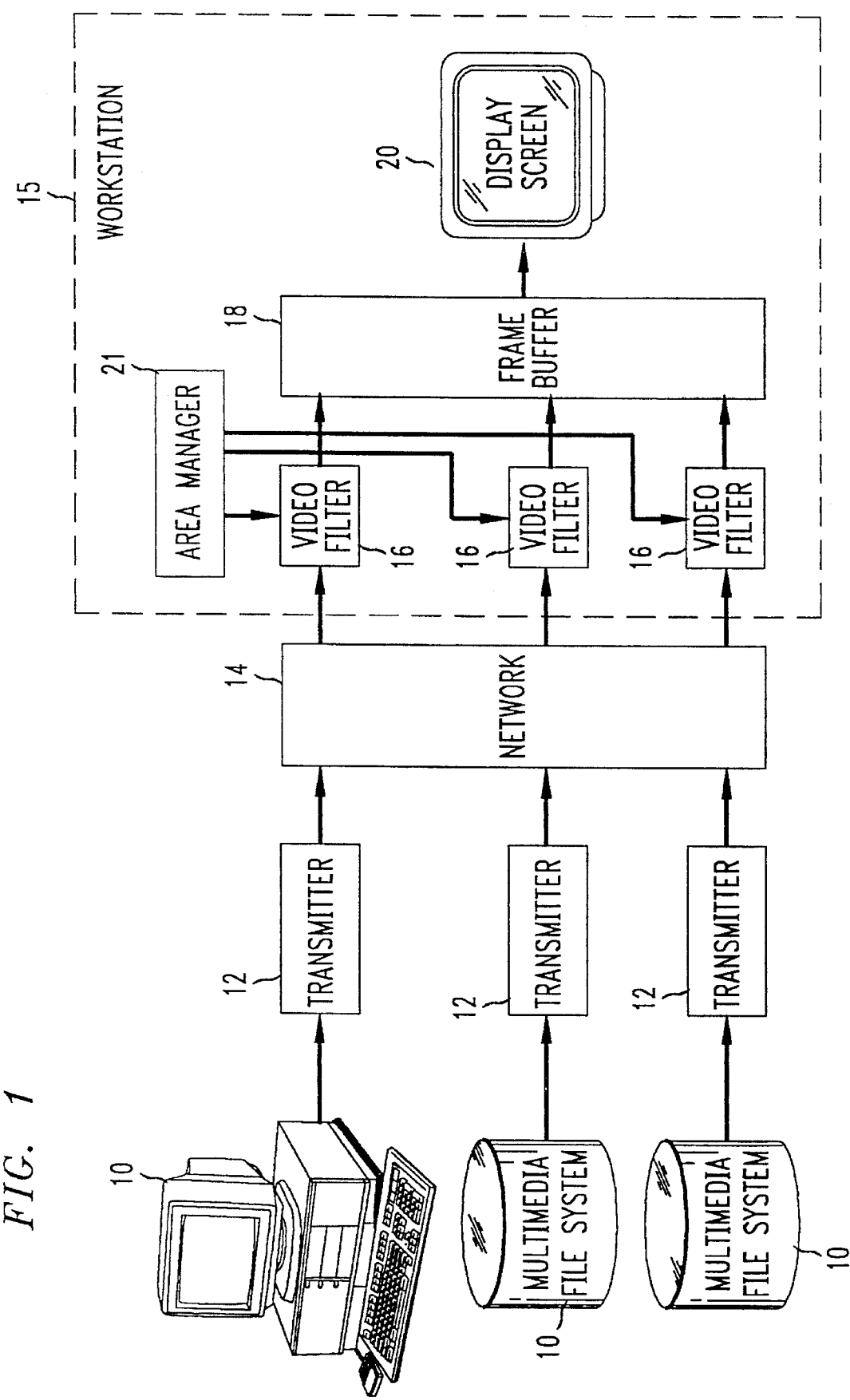
FIG. 1 is a schematic diagram of an illustrative architecture of a transmission system and workstation in accordance with the principles of the present invention.

Referring now to the drawings, FIG. 1 shows the architecture of an illustrative transmission system comprising an asynchronous, e.g., packet-switched, network and the apparatus of the present invention. The system includes one or more video sources 10, one or more transmitters 12, an asynchronous network 14, and a workstation 15. The latter includes one or more video filters 16, a frame buffer 18, a video display screen 20, and an area manager 21. Video sources 10 typically may be, for example, multimedia file systems, digital camera signals, or appropriately processed signals output from a personal computer.

Each transmitter 12 receives data from a respective video source 10, digitizes the data, and forms the data into "packets." The data packets are transmitted through asynchronous network 14. Video filters 16 receive and store the video data. Video filters 16 output the video data to frame buffer 18. Frame buffer 18 outputs the data to display screen 20. Although not explicitly shown in the drawing, a line buffer is illustratively interposed between the frame buffer and the display screen to store successively lines of data as they are presented for display on the display screen. Workstation 15 includes other circuitry (not shown) for performing such functions as depacketizing data and the like.

Figure 2:
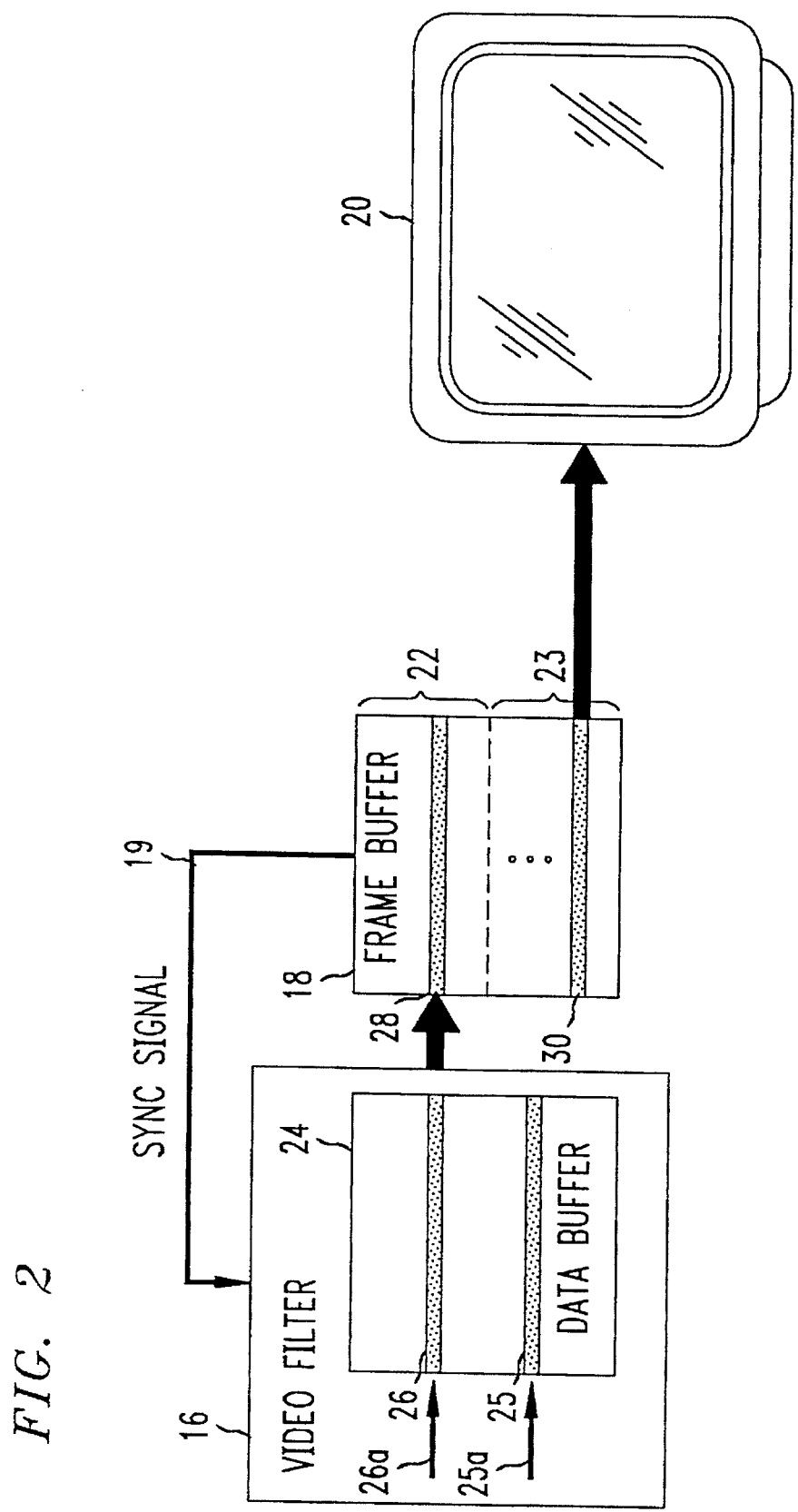
FIG. 2 is a schematic diagram of the receiver and display circuitry of FIG. 1.

As can be seen from FIG. 2, video filter 16 receives synchronization signals from frame buffer 18 on lead 19. Each synchronization signal triggers the transfer of data from the video filter to frame buffer 18. Frame buffer 18 is partitioned into at least two different segments 22 and 23, each illustratively storing half of a frame of data. Data are received from video filter 16 into segment 22, while other data are scanned to display screen 20 from segment 23. Frame buffer 18 sends a synchronization signal to video filter 16 after the contents of segment 23 have been scanned to display screen 20. Each time video filter 16 receives a synchronization signal from frame buffer 18, the video filter sends new video data to the frame buffer, where it is stored in the segment whose data were just read out.

It will be appreciated from the foregoing description that data are read from frame buffer 18 to display screen 20 on a continuous, regular basis. Moreover, frame buffer 18 "smooths out" variations in the rate at which data are received from the network. Them is still a problem, however, and at the heart of our invention lies the discovery of the existence of that problem—a problem not heretofore appreciated in the prior art.

Figure 3:
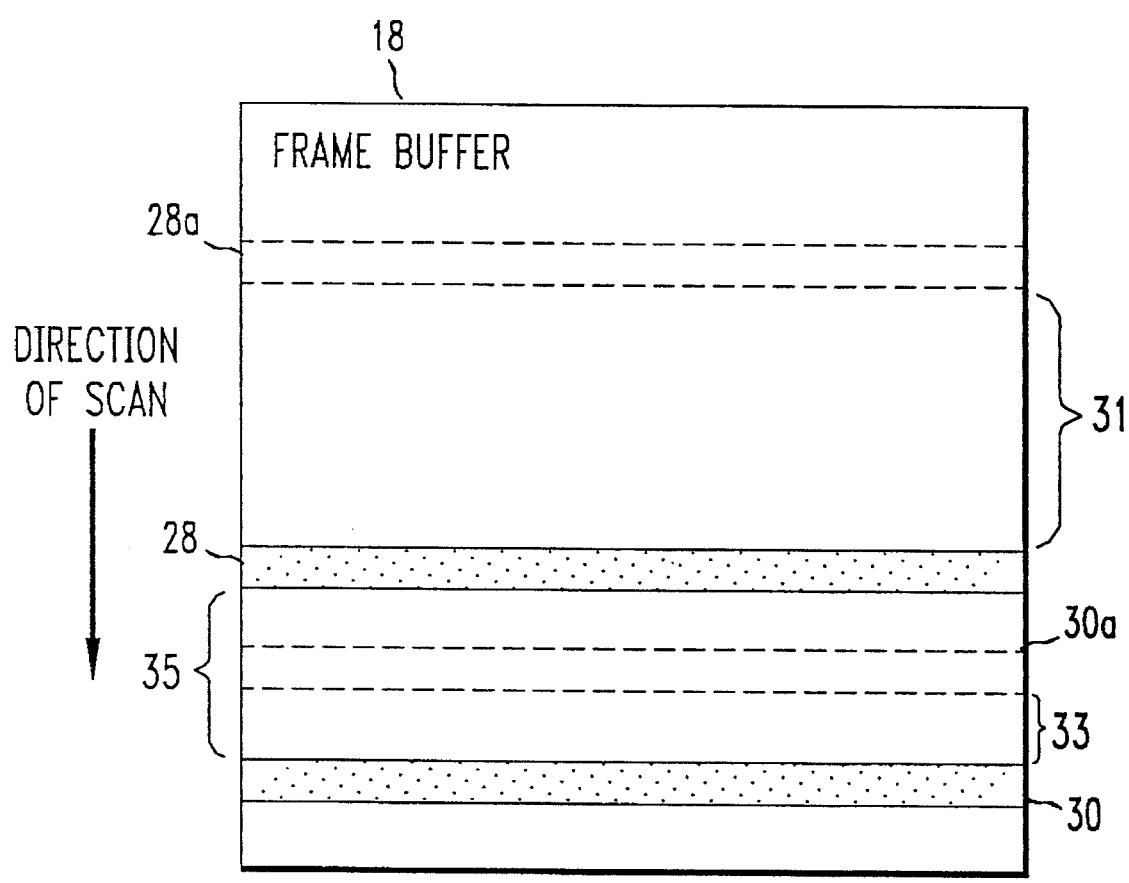
FIG. 3 is a block diagram of the contents of a frame buffer, helpful in explaining the problem overcome by the present invention.

The nature of the problem can be understood by considering FIG. 3, which illustrates the effect on the contents of a frame buffer that a disparity between the frame rates of the video source and the display screen will have, absent use of the present invention (as described in detail hereinbelow). In particular, row 28 of FIG. 3 represents, in this illustration of the problem, the row into which video data currently are being transmitted from video filter 16. Row 30 represents the row from which data is currently being output from the frame buffer. Reference numbers 28a and 30a indicate the rows to which data was written and read from, respectively, at some earlier instant in time. The number of rows separating row 28a from row 28 and separating row 30a from row 30 are indicated by distances 31 and 33, respectively. Rows 28 and 30 are separated from each other by a distance 35.

In this illustration, it is assumed that the video source frame rate is higher than the display screen frame rate. Thus, distance 31 is greater than distance 33, because video data has been entering frame buffer 18 faster than it has been output therefrom. Here, then, is the problem. At some point, rows 28 and 30 will overlap. That is, distance 35 decreases to zero. Consequently, at some point during the inputting of data to a particular row, the entire row of data will be read out (at a very rapid rate relative to the data input rate) to the aforementioned line buffer. The line buffer will thus capture data that originated from two different video frames. The appearance of data from two different video frames in a single display line results in aberrations in the displayed image. Such aberrations will typically continue for many lines of data, often extending over long periods of time (e.g., possibly as long as several minutes)—particularly if the aforementioned frame rate disparity is relatively small. In systems using the NTSC video format, for example, such aberrations are manifested by a colored line that appears to sweep across the screen. It should be appreciated that these effects will occur regardless of whether, as just assumed, the frame rate of the video source exceeds the frame rate of the display screen or whether the opposite relationship obtains. Moreover, the problem also may appear even if a line buffer is not used in the system, i.e., if data are read from each row of the frame buffer on a pixel-by-pixel basis.

Eventually, row 28 will appear "below" row 30, so that it is no longer the case that data from two different video frames are appearing in the same line. At that point, the aberrations cease until such time as the data inputting again overtakes the data reading.

In accordance with the invention, the problem just outlined is overcome by taking steps to ensure that video data from only one frame is scanned to the display screen at any given time.

A preferred way of carrying this out, as shown in FIG. 2, is to provide within video filter 16 a data buffer 24 which receives asynchronously the data from the network and supplies that data to frame buffer 18 as the output of video filter 16. Data buffer 24 is a circular buffer, and thus data entering the buffer continuously overwrite older data previously stored in the buffer. Data buffer 24 is passive in the sense that data enters the buffer at the video source rate, and data are read from the buffer at the rate required by display screen 20.

Within the video filter, as shown in the FIG. 2, data is currently being input to data buffer 24 at a first, average rate at a location denoted as location 25 and are stored in sequential locations of the buffer memory. Data are currently being read from sequential memory locations of data buffer 24 beginning at a location 26. Data buffer 24 illustratively has storage for two full video frames. The distance between locations 25 and 26, the addresses of which are identified by respective memory location pointers 25a and 26a, is periodically monitored, e.g., once per frame. If it is observed that that distance, i.e., the arithmetic difference between the pointer values, has become less than some predetermined amount—illustratively one half of a frame—this serves as an indication that the kind of overlap described above as occuring in the prior art frame buffer, will eventually occur here in buffer 24. If this situation were to be left uncorrected, lines containing data from two different video frames would, disadvantageously, be transferred to frame buffer 18, again giving rise to the aberrations described above. This is prevented, however, in accordance with a feature of the invention, by changing one or both of the pointer values so that the location to which incoming data is to be input and/or the location from which data is read out to frame buffer 18 is changed, the change being such as to increase the distance between those locations. In preferred embodiments, it is the output pointer that is advanced or regressed, the amount of change corresponding to the storage area of a full stored frame.

The practical effect of the foregoing is to either repeat or skip the outputting of a frame from data buffer 24 to the frame buffer. Whether a frame is skipped or repeated depends upon whether the frame rate of the video source exceeds or is less than the two frame rate of the display screen. This is determined by the relative positions of the input and output pointers, i.e., whether the input pointer is ahead of or behind the output pointer. Illustratively, this can be determined from the arithmetic sign of the difference between the values of the input and output pointers. If the frame rate of the video source exceeds the frame rate of the display screen, a frame is skipped. Conversely, if the frame rate of the video source is less than the frame rate of the display screen, a frame is repeated.

Overall, then, it is ensured that data never is simultaneously written to and read from the same row of frame buffer 18 and aberrations are prevented from appearing on the display screen.

Figure 4:
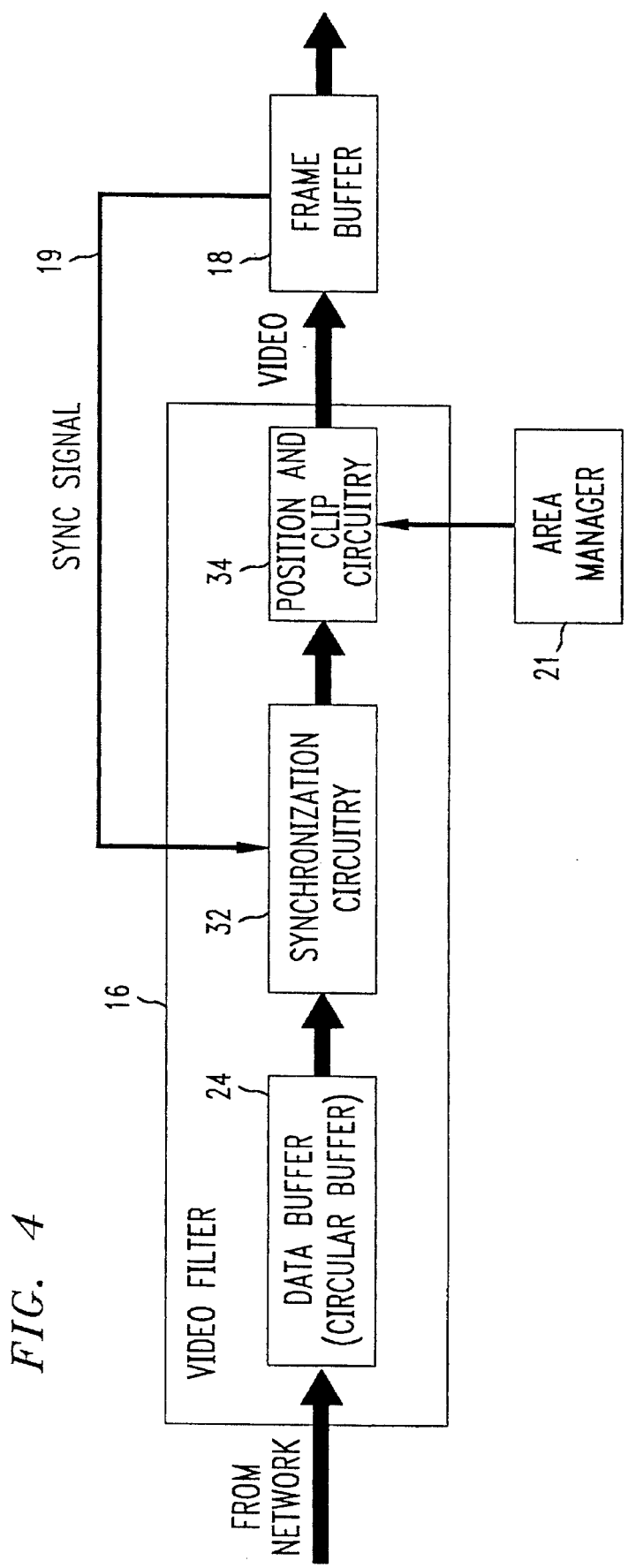
FIG. 4 is a block diagram of a video filter circuit used in the workstation of FIG. 1.

FIG. 4 shows in greater detail illustrative internal circuitry of video filter 16. In addition to data buffer 24, video filter 16 further includes synchronization circuitry 32, and position and clip circuitry 34.

Synchronization circuitry 32 controls the flow of data between data buffer 24 and position and clip circuitry 34 in response to a synchronization signal received from frame buffer 18. When synchronization circuitry 32 receives a synchronization signal from frame buffer 18, the synchronization circuitry reads a segment of data, illustratively a half-frame of data, from the memory location within data buffer 24 identified by the current value of the aforementioned output pointer 26a and provides that data to position and clip circuitry 34. As described in greater detail with respect to FIG. 5, synchronization circuitry 32 thereupon performs the aforementioned function of changing the value of the output pointer if needed.

As described further below with respect to FIG. 6, position and clip circuitry 34, under the control of area manager 21, clips data as required to permit simultaneous display of data from multiple data sources and positions the data in frame buffer 18. Position and clip circuitry 34 processes data as the data pass between data buffer 24 and frame buffer 18. That is, position and clip circuitry 34 operates on the data without buffering the data.

Figure 5:
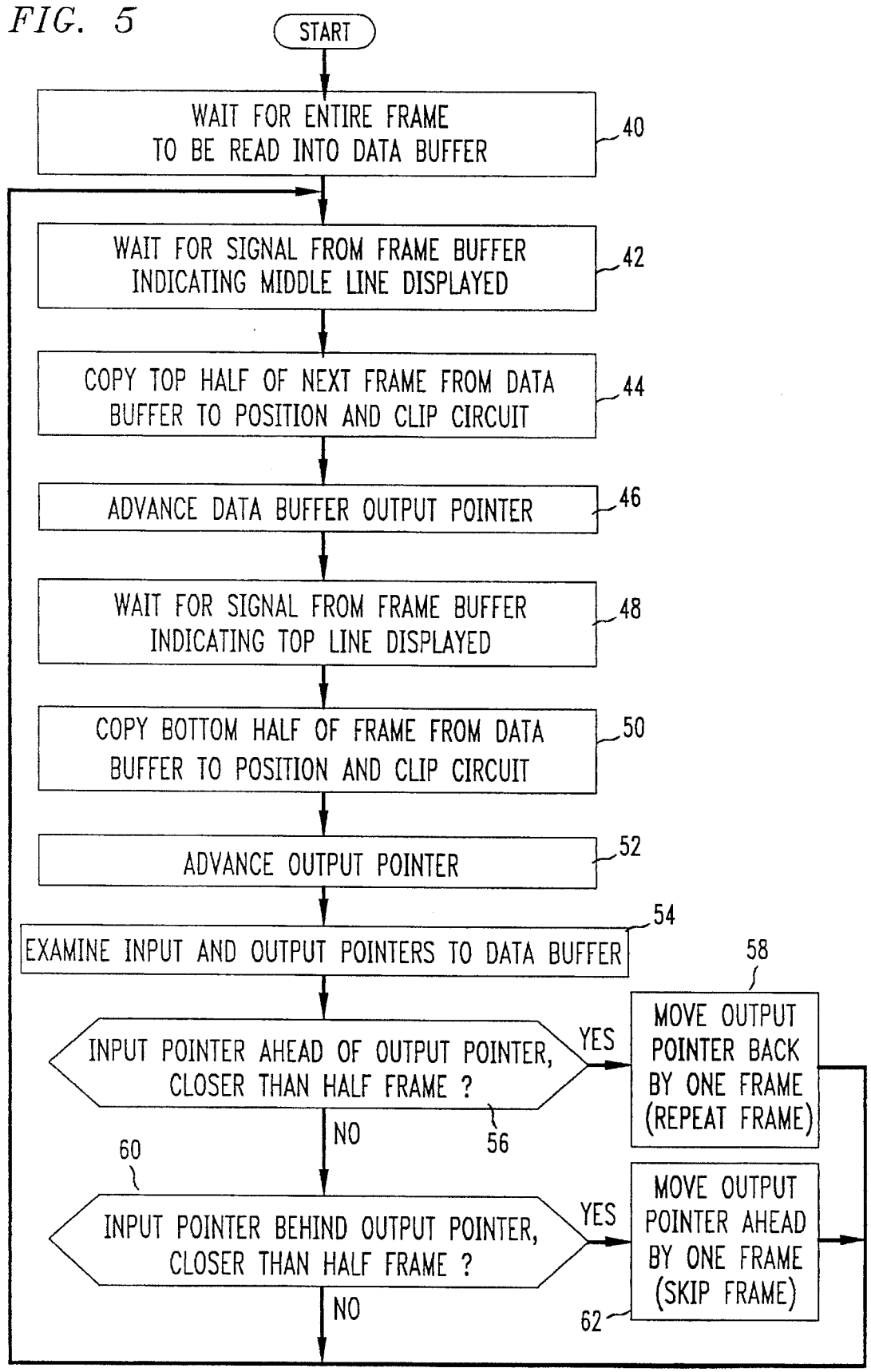
FIG. 5 is a flowchart of a method for synchronizing a transmission from a video source with the display of data, in accordance with the principles of the present invention.

The operation of video filter 16 will now be summarized with reference to the flowchart of FIG. 5.

Data buffer 24 first accumulates an entire frame of data from asynchronous network 14, as shown in box 40. Meanwhile, synchronization circuit 32 waits for a synchronization signal from frame buffer 18 which indicates that a predetermined line of the frame buffer, illustratively the middle line, is presently being displayed on display screen 20 (box 42). Upon receipt of the synchronization signal from frame buffer 18, synchronization circuit 32 causes the top half of the next frame to be copied from data buffer 24 to position and clip circuitry 34 (box 44). Synchronization circuit 32 then advances the output pointer of data buffer 24 to the last memory location that was output from buffer 24 (box 46). Data from position and clip circuitry 34 is sent to frame buffer 18. Synchronization circuitry 32 then waits for a second synchronization signal from frame buffer 18 indicating that a second predetermined line of the frame buffer, illustratively, the top line, is presently being displayed (box 48). Upon receiving the second synchronization signal, synchronization circuitry 32 causes the bottom half of the frame to be copied from data buffer 24 to position and clip circuitry 34 (box 50). The output pointer of data buffer 24 again is advanced (box 52).

Synchronization circuitry 32 next examines the input and output pointers of data to buffer 24 (box 54). Synchronization circuitry 32 decides whether to repeat or skip a given frame, so as to avoid simultaneously reading from and writing to the same row of frame buffer 18, the decision being made on the basis of the proximity and relative position of the input and output pointers. As shown in boxes 56 and 58, if the input pointer is ahead of the output pointer by less than half of a frame, the output pointer is regressed by one frame. This has the effect of causing a frame to be repeated. If the input pointer is not ahead of the output pointer by less than half of a frame, synchronization circuitry 32 determines whether the input pointer is behind the output pointer but is closer than half of a frame (box 60). If this condition is true, the output pointer is advanced by one frame. This has the effect of causing a frame to be skipped without ever having been sent to frame buffer 18 (box 62). If the condition is not true, the pointers are not changed. The process then returns to box 42 at which synchronization circuitry 32 again waits for a synchronization signal from frame buffer 18 indicating that the middle line of the frame buffer is displayed on display screen 20 (box 42).

Figure 6:
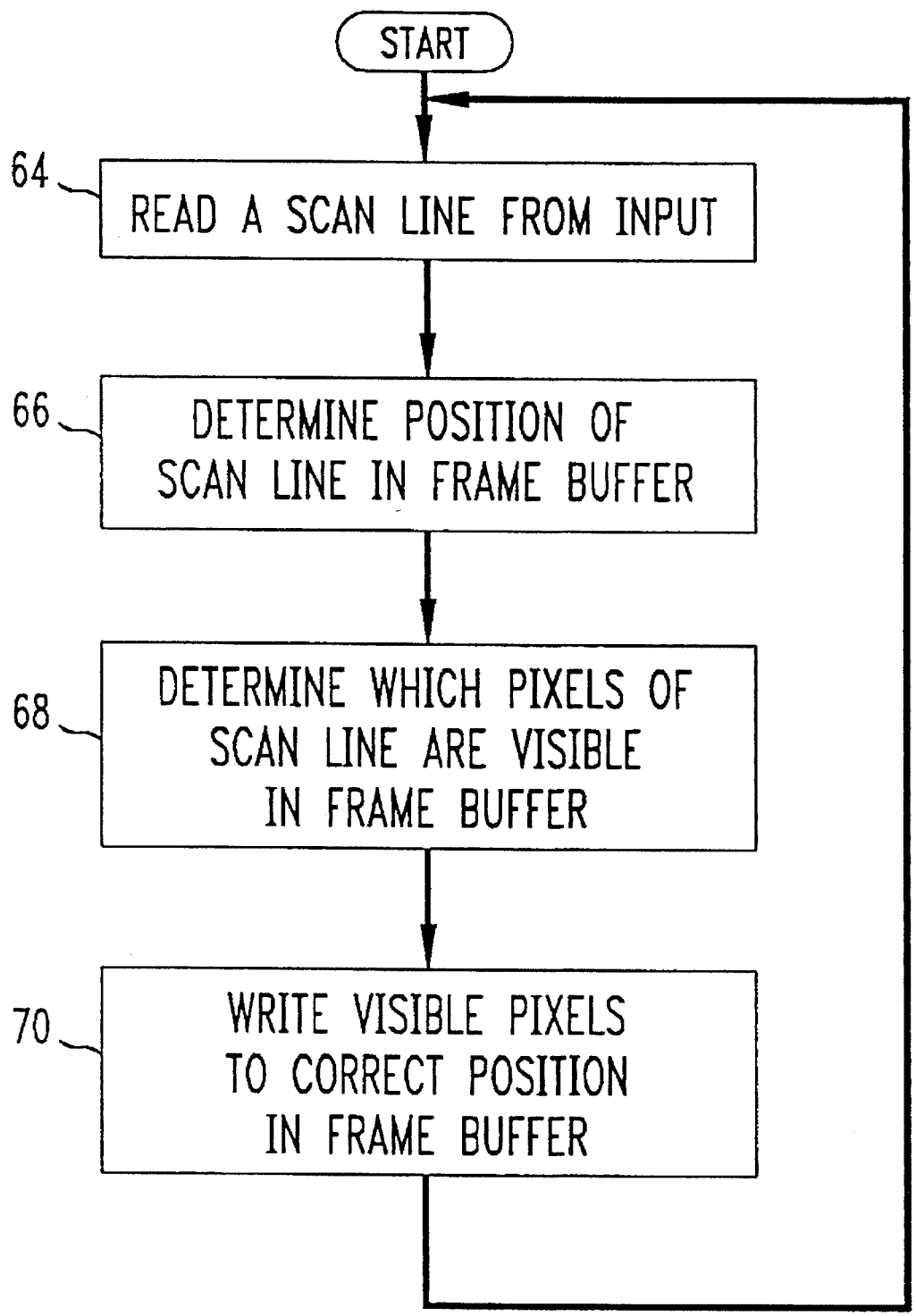
FIG. 6 is a flowchart of a method for positioning and clipping video data for display on a display screen.

FIG. 6 shows the operation of position and clip circuitry 34. As mentioned above, position and clip circuitry 34 determines the appropriate position on display screen 20 of the video data stored in buffer 24. More particularly, position and clip circuitry 34 reads a line from its input (box 64) and determines the location within frame buffer 18 at which that line is to be stored in order to be displayed at the appropriate position of the display screen (box 66). Position and clip circuitry 34 then determines, on the basis of information received from area manager 21, which of the data received from data buffer 24 are to be passed to the frame buffer for display (box 68). Position and clip circuitry 34 then writes that data to the correct position in frame buffer 18 (box 70).

When data from two or more video sources are to be displayed on a single video display, each pixel of the video display receives data from only one video filter—and thus from only one positon and clip circuitry 34—at a time. For example, if there are two video sources sending data to frame buffer 18, there will be two independent video filters 16, each having independent position and clip circuitry 34. Area manager 21 operates in a conventional manner to control this process. Moreover, when images from two different video filters (i.e., from different data sources) would overlap on the display screen, area manager 21 ensures that only the video filter that stores the image to be perceived as being "on top" provides data to frame buffer 18 for the overlap area.

When two or more video filters 16 pass data to a single frame buffer 18, the synchronization circuit 32 of each video filter receives a synchronization signal from frame buffer 18. In this way, each video filter is directed independently to transmit a segment of data from its respective data buffer 24 to frame buffer 18. The different video filters need not write to the same location (e.g., the same row) in the frame at the same time. Because each video filter will write to predetermined, different ones of the pixels due to the operation of area manager 21 and position and clip circuitry 34, each video filter can output data to frame buffer 18 at its own rate. Indeed, the video filters need only to independently ensure that data are not written to the segment of the frame buffer currently being scanned to display screen 20.

Video filter 16 typically may be implemented using distributed processing. Four processors typically may be required to cooperatively capture a video stream at NTSC communications rates. Many processors can send display lines to a frame buffer in parallel for reconstruction and display. If the several processors are writing to distinct lines in frame buffer 18, they will not interfere with each other. The lines of a video image are interleaved among these processors in a round-robin fashion starting from the top of the image. The output from each of the processors is synchronized using the method described above, that is, by sending a synchronization signal to each of the video filters two or more times per frame. When technology advances such that a single processor can process video data at sufficient rates, this additional synchronization step will no longer be necessary.

Figure 7:
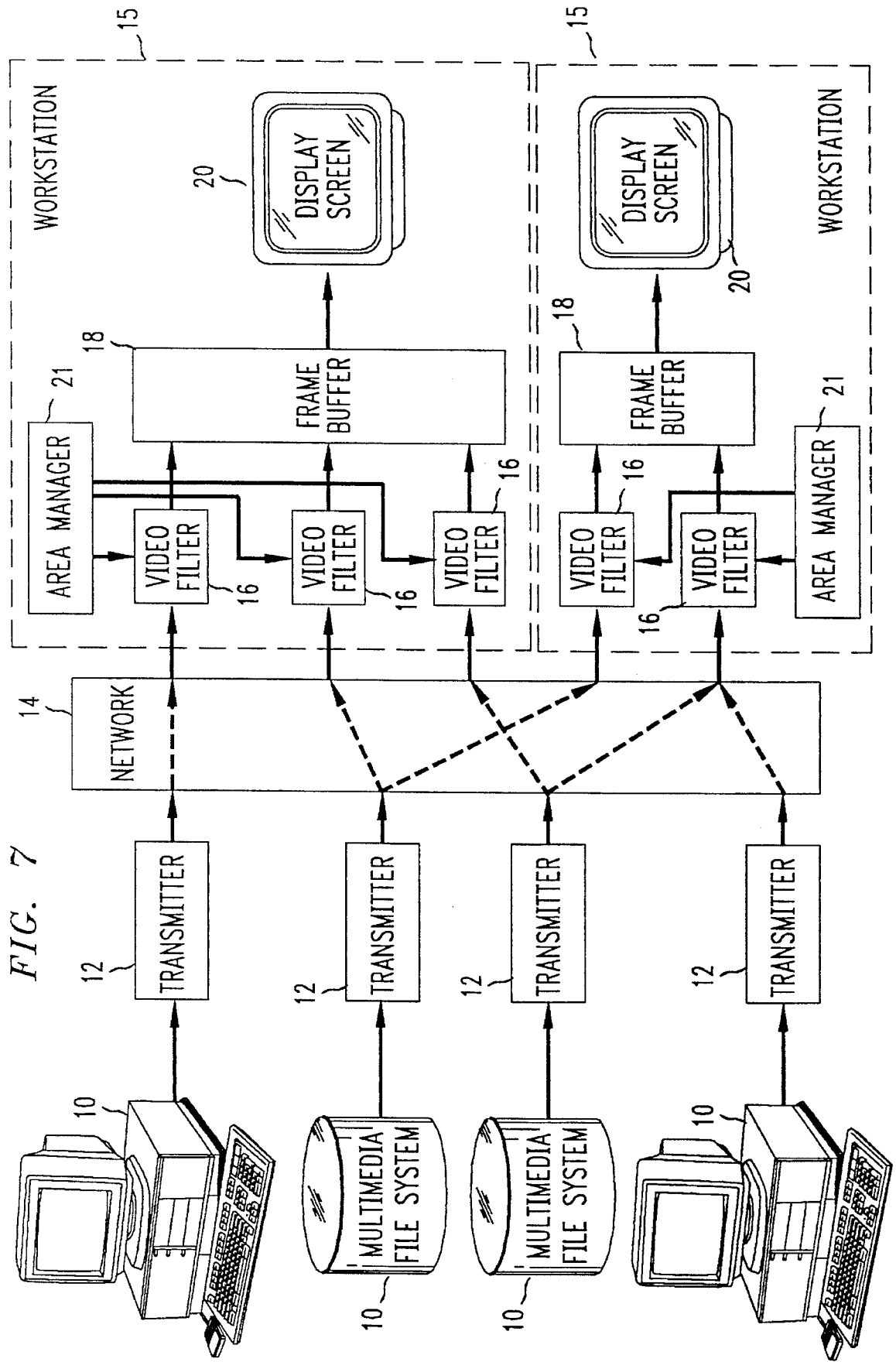
FIG. 7 is a schematic diagram of an illustrative architecture in accordance with the invention which permits simultaneous broadcasts to several workstations.

Thus far the invention has been described in the context of multiple sources providing video data to a single receiver. In another illustrative embodiment of the invention, data from one or more video sources are broadcast to two or more workstations simultaneously. FIG. 7 shows the architecture of an illustrative transmission system comprising multiple sources 10 and multiple workstation display screens 20. Video filters 16 at each workstation receive the broadcast data. As described above, a separate video filter 16 typically is provided to receive data from each different video source. Video filters 16 retransmit data to their respective display screens independently of one another, thus eliminating the need to synchronize operation of the workstations with each other or with the video source.

It will be understood that the foregoing is merely illustrative of the principles of the invention, and that various modifications can be made by those skilled in the art without departing from the scope and spirit of the invention. For example, although video filter 16 has been described in the context of a device located at the workstation, video filter 16 could alternatively be disposed within the transmission system, preferably at the local exchange carrier. In that instance, video filter 16 and frame buffer 18 would be coupled by an asynchronous network. In other applications of the invention, the principles of the invention are used together with known sophisticated processing techniques to overcome significant mismatches between the frame rate of the video source and the frame rate of the display. For example, a technique for convening 24 frame/sec film to 30 frame/sec television is used to create a new frame between each sequence of four film frames. The new frame is created by interlacing the juxtaposed adjacent film frames. The newly created frame is then transmitted from a data buffer, such as data buffer 24, to frame buffer 18 as described with respect to FIG. 5. The scope of this invention is limited only by the claims.

We claim:

1. Apparatus for displaying video data comprising:

means for asynchronously receiving the video data from an asynchronous network;

means for formatting a video display signal, that includes the video data, for display on a video display means, said formatting means including means for receiving the video data and outputting the formatted video display signal; and means for synchronizing the receipt of the video data by the formatting means with the outputting of the formatted video display signal, said synchronizing means including means for positioning and clipping the video data prior to outputting the video data to the formatting means such that the video display signal includes video data from only a single frame at a time.

2. The apparatus of claim 1 wherein the formatting means simultaneously receives video data transmitted from a plurality of video sources.

3. The apparatus of claim 2 wherein the synchronizing means comprises:

means for storing video data received from the asynchronous network; and means for outputting the video data from the storing means to the formatting means in response to a synchronizing signal from the formatting means.

4. The apparatus of claim 3 wherein:

the storing means includes means for indicating the locations in the storing means at which data are currently input and output; and the outputting means includes means, responsive to the locations indicated by the indicating means, for retransmitting to the formatting means predetermined ones of the video data previously output from the storing means to the formatting means.

5. The apparatus of claim 3 wherein:

the storing means includes means for indicating the locations in the storing means at which data are currently input and output; and the outputting means includes means, responsive to the locations indicated by the indicating means, for preventing predetermined ones of the video data in the storing means from being output from the storing means to the formatting means.

6. Apparatus for displaying video data comprising:

means for storing video data, said storing means asynchronously receiving the video data from an asynchronous network at a first, average information rate and outputting the video data at a second information rate;

means for formatting a video display signal that includes the video data for display on a video display means, the formatting means receiving video data output from the storing means and outputting the video display signal at a third information rate;

means for positioning and clipping the video data prior to receipt of the video data by the formatting means; and means, responsive to a synchronization signal from the formatting means, for controlling the second information rate, such that the video display signal includes video data from only a single frame at a time.

7. The apparatus of claim 6 further comprising means for selectively retransmitting from the storing means to the formatting means predetermined ones of the video data previously output from the storing means to the formatting means if the third information rate exceeds the first information rate.

8. The apparatus of claim 6 further comprising means for selectively preventing predetermined ones of the video data from being output from the storing means if the first information rate exceeds the third information rate.

9. The apparatus of claim 6 wherein said storing means receives simultaneously the video data from a plurality of video sources.

* * * * *